(12) United States Patent
Glock

(10) Patent No.: US 11,066,613 B2
(45) Date of Patent: Jul. 20, 2021

(54) METHOD AND APPARATUS FOR GASIFYING CARBON-CONTAINING MATERIAL

(71) Applicant: Gaston Glock, Velden (AT)

(72) Inventor: Gaston Glock, Velden (AT)

(73) Assignee: GLOCK ÖKOENERGIE GMBH

(\*) Notice: Subject to any disclaimer, the term of this patent is extended or adjusted under 35 U.S.C. 154(b) by 386 days.

(21) Appl. No.: 15/204,602

(22) Filed: Jul. 7, 2016

(65) Prior Publication Data

US 2017/0369801 A1  Dec. 28, 2017

Related U.S. Application Data

(63) Continuation-in-part of application No. 15/191,327, filed on Jun. 23, 2016.

(51) Int. Cl.
| | |
|---|---|
| *C10J 3/84* | (2006.01) |
| *C10K 1/02* | (2006.01) |
| *C10J 3/26* | (2006.01) |
| *C10K 3/00* | (2006.01) |
| *C10J 3/72* | (2006.01) |
| *B01D 46/24* | (2006.01) |

(52) U.S. Cl.
CPC . *C10J 3/84* (2013.01); *C10J 3/26* (2013.01); *C10J 3/721* (2013.01); *C10K 1/024* (2013.01); *C10K 3/005* (2013.01); *B01D 46/2407* (2013.01); *B01D 2273/20* (2013.01); *C10J 2300/092* (2013.01); *C10J 2300/0956* (2013.01); *Y02E 20/16* (2013.01); *Y02E 50/10* (2013.01)

(58) Field of Classification Search
CPC .............................. B01D 46/2407; C10J 3/84
See application file for complete search history.

(56) References Cited

U.S. PATENT DOCUMENTS

| | | | | |
|---|---|---|---|---|
| 5,401,282 A | * | 3/1995 | Leininger | C10J 3/06 252/373 |
| 6,077,490 A | * | 6/2000 | McIlroy | B01D 46/002 423/215.5 |
| 7,896,956 B2 | * | 3/2011 | Takase | B01D 46/006 110/345 |
| 2002/0106538 A1 | * | 8/2002 | Lenglet | C01B 3/32 429/411 |
| 2013/0019528 A1 | * | 1/2013 | Mall | C10J 3/26 48/87 |
| 2013/0142723 A1 | * | 6/2013 | Dara | C10J 3/26 423/352 |
| 2013/0276628 A1 | * | 10/2013 | Chalabi | B01D 46/0058 95/9 |

\* cited by examiner

*Primary Examiner* — Matthew J Merkling
(74) *Attorney, Agent, or Firm* — Raven Patents, LLC

(57) ABSTRACT

An apparatus and a method for gasifying carbon-containing materials in which the material for gasification and oxygen, usually in the form of air, are supplied to a gas generator where the gasification takes place in a fixed bed reactor. The product gas is drawn off via a product gas line and introduced into a hot gas filter. A filter, preferably provided with filter candles, removes solids such as particles not yet gasified, ash and foreign bodies, while clean gas passes through and is taken off via a clean gas line. An outlet is provided in the bottom region of the hot gas filter to remove residual solids. The hot gas filter is supplied through a line with oxygen, preferably in the form of air, in its middle height region, between the filter bottom and the outlet.

7 Claims, 2 Drawing Sheets

METHOD AND APPARATUS FOR GASIFYING CARBON-CONTAINING MATERIAL

CROSS-REFERENCE TO RELATED APPLICATIONS

This application is a continuation-in-part under 35 U.S.C. § 120 of U.S. patent application Ser. No. 15/191,327, filed Jun. 23, 2016, which is hereby incorporated by reference.

BACKGROUND

The invention relates to an apparatus and a method for gasifying wood or other carbon-containing material in accordance with the appended claims, and with WO 95/24591.

This publication discloses a fluidized bed furnace for a combined-cycle power plant, and provides for the reactor to have a secondary air supply and a tertiary air supply, which enter the reactor at different heights.

US 2008/0127824 A1 discloses a regenerative filter for a coal gasification plant, in which uncombusted material is combusted by supply of oxygen, taking place by means of nitrogen/air mixing.

U.S. Pat. No. 6,077,490 provides for similar by means of two filter candles.

Regarding the prior art in general the following may be stated: wood is composed chemically of three principal components:
cellulose
hemicellulose
lignin
remainder Cellulose The principal constituent of all woody plants, at about 50%, is cellulose. Cellulose is a molecule with a chain construction formed of individual glucose units. The actual building block of the cellulose is cellobiose, a disaccharide.

Hemicellulose

Hemicellulose consists of polymeric carbohydrates whose constituents are composed of pentoses and hexoses. Like cellulose, hemicellulose is a polysaccharide.

Lignin

The third component of wood, at about 25-30% by mass, is lignin, a polymer composed of phenylpropane units.

Remainder

In addition to cellulose, hemicellulose, and lignin, the wood also contains fats, resins, terpenes, dyes, and tannins, and also mineral constituents.

Elemental Composition

Empirical formula of wood:

$$C_{6.1}H_9O_{4.2} \qquad (1.2)$$

Table sugar for comparison:

$$C_{12}H_{22}O_{11} \qquad (2.2)$$

| Wood type | C [m-%] | H [m-%] | O [m-%] | N [m-%] | Cl [m-%] | Ash [m-%] |
|---|---|---|---|---|---|---|
| Beech | 49 | 6 | 44 | 0.1 | 0.001 | 0.9 |
| Spruce | 50 | 6 | 43 | 0.05 | 0.001 | 0.95 |

Thermochemical Conversion

Thermochemical enhancement methods (gasification) transform solid bioenergy carriers, primarily under the influence of heat, into gaseous secondary energy carriers. In the course of the gasification, biomass is converted at high temperatures very largely completely into burnable gases (i.e., into what is called synthesis gas). The operation is supplied substoichiometrically with an oxygen-containing gasifying agent (air), one of whose abilities is to convert the carbon present in the biomass into carbon monoxide. At the same time, the partial combustion of the feed material provides the required process heat, to allow the gasification process actually to take place (autothermal gasification). The resulting gas, which is of low calorific value, can be used in burners to provide heat and, among other applications, in gas engines or gas turbines for generating electricity.

Cocurrent Fixed Bed Gasification

With this mode of gasification, the particulate solids (wood) are not agitated by the gas stream. The fuel moves in the form of a bed through the gasifier. The gasification residue is collected in the bottom region of the gasifier. Fuel and gas travel the same route.

Heating and Drying

The first phase is characterized in that the wood is slowly heated from the outside inward. Unbound water is given off in the form of steam. This process is endothermic (energy is required).

Degassing and Thermal Decomposition (pyrolysis)

The temperature in the pyrolysis phase or pyrolysis zone ranges between 200° C. and 400° C. At these temperatures, oxygen (O2) and hydrogen (H2) are degassed.

In this phase, the wood building blocks identified in the section above are degassed. In the course of the pyrolysis, from cellulose and hemicellulose, carbon dioxide (CO2) and carbon monoxide (CO) are formed, as are acetic acid (CH3COOH), acetone (C3H6O), phenols (C6H5OH), and water (H2O). The long-chain hydrocarbons formed during the pyrolysis are referred to as tars.

The thermal decomposition of lignin produces methanol (CH3OH) and aromatic hydrocarbons (e.g., benzene (C6H6)).

The solid product of the pyrolysis is charcoal.

Oxidation

The energy needed for the drying, pyrolysis, and reduction is formed in this zone. Carbon and hydrogen give off energy as they combust (exothermic). In this zone, the temperatures range between 650° C. and 1100° C., and $CO_2$, $H_2O$ and $CH_4$ are formed (without subscription hereinafter), as shown in FIG. 1.

Reduction

In the reduction zone, the formation of burnable gas is made possible. This is where the actual gasification of the solid carbon occurs. In the reduction zone, the intermediates formed in the preceding oxidation, such as CO2 and H2O, are reduced over the glowing charcoal. The products here are CO, H2, and higher hydrocarbons. This occurs at about 1100-650° C.

The process of reduction is dependent on the prevailing temperature. The reaction of hydrogen and carbon to form methane decreases sharply between 400° C. and 600° C. At temperatures above 1000° C., methane is no longer formed. At high temperatures, the Boudouard reaction attains a good yield of carbon monoxide. This reaction is relatively slow.

There is a divergent tendency, dependent on temperature, between high CO production and high hydrogen production. Furthermore, hydrogen production falls back in favor of methane formation. Both components act to increase the heating value. High hydrogen content also increases the problem of engine knocking. Knock-resistant methane is a good fuel gas, but experience suggests that gas generation conducted to a high methane content also entails a high tar loading in the gas.

Course of the Gasification Process

First, wood is heated by supply of heat, and at the same time the water present in the gasifier material is evaporated. The quantity of heat required is generated by the partial combustion of the resultant carbonization gases and the oxidation of carbon and hydrogen.

The resultant charcoal serves as a reaction area for the oxidation and reduction of carbon, carbon monoxide, carbon dioxide, and hydrogen. In the course of this process, the charcoal reduces in size, meaning that the surface area of the particles becomes greater, and hence the reaction rate goes up.

It is clear here that the reaction zone must be regarded as a whole and that the reduction and oxidation proceed simultaneously.

Since the reduction of the carbon dioxide by the charcoal is endothermic, the temperature falls from bottom to top, causing the reactions to subside. There is no clear separation between reduction zone and oxidation zone.

It is thought that in the oxidation zone the carbon undergoes combustion to form $CO_2$, since $CO_2$ is no longer stable at the high temperatures prevailing there, of 1000-1300° C.

A portion of the carbon monoxide is supposed then to be combusted to form $CO_2$ in the presence of oxygen. This $CO_2$, however, is unstable on account of the high temperatures, and is reduced to CO over the glowing carbon. When the oxygen has all been used up, CO no longer undergoes combustion, and remains stable in its concentration in spite of the decreasing temperature. Therefore, according to the last consideration, however, reduction reactions must also be assumed here, since to start with $CO_2$ is present.

As becomes clear from the procedures referred to above, the gasification produces a mixture of burnable and non-burnable gases, which divide up as follows:

1. burnable gases:

| | |
|---|---|
| carbon monoxide | CO |
| hydrogen | $H_2$ |
| methane | $CH_4$ | higher molecular mass hydrocarbon compounds 2. nonburnable gases:

| | |
|---|---|
| carbon dioxide | $CO_2$ |
| nitrogen | $N_2$ |
| steam | $H_2O$ |
| small amounts of oxygen | $O_2$ |

| Components | Volume fraction [vol %] | Heating value [MJ/m³] | Minimum air mass [$m^3_{air}/m^3_{gas}$] | Methane number |
|---|---|---|---|---|
| Hydrogen $H_2$ | 17.1-19.8 | 10.8 | 2.36 | 0 |
| Oxygen $O_2$ | 0.4-0.6 | 0 | — | — |
| Nitrogen $N_2$ | 45 | 0 | — | — |
| Carbon monoxide CO | 20-23.8 | 12.6 | 2.41 | 75-100 |
| Carbon dioxide $CO_2$ | 8.5-16.2 | 0 | — | — |
| Methane $CH_4$ | 1.5-2.9 | 35.9 | 9.57 | 100 |
| Higher HCs $C_mH_n$ | 0.2 | ≈50-90 | variable | — |

Process regime, residence time, temperature and fuel type, particle sizing and moisture influence the composition of the wood gas. Typical heating values for wood are in the order of magnitude of 3.5-5.5 MJ/m3, making wood gas a weak gas.

Given that 5-10 wt % of the starting material remains as ash, but primarily as ungasified wood residues, and must be properly disposed of, there is both economic and environmental interest in likewise maximizing the gasification of these wood constituents that are obtained in uncombusted form in wood gasifications in accordance with the prior art. This is also the object of the invention.

The invention achieves this object with an apparatus and method having the features indicated in the appended claims.

DETAILED DESCRIPTION

According to an embodiment of the present invention, the charcoal obtained in ungasified form in the bottom region of the gas generator is at least predominantly transferred with the gas stream to the downstream hot gas filter. This can be carried out through appropriate choice of the flow rate in the manner of pneumatic transport, as has long been known in the conveying of bulk goods. In the hot gas filter, charcoal, along with coal dust and entrained ash, is deposited on the surface of the filter, composed preferably of filter candles. Depending on the pressure drop at the filter upstream of the filter candles, oxygen (usually in the form of air) is introduced in as far as possible a pulselike manner, causing the filter cake on the filter candles to break apart, and, promoted by pressure wave and temperature, there is a second gasification step, through which the entrained charcoal and/or the coal dust is to by far the predominant extent gasified. The fraction that is still not being gasified is ultimately gasified by the oxygen supplied in the bottom part of the filter—again preferably in the form of air. Depending on the process parameters, which are easily determined for the plant constructor and the plant operator, if not being already known anyway, it is possible to carry out the gasification of wood substantially completely, leaving only the mineral ash.

Figure 1:
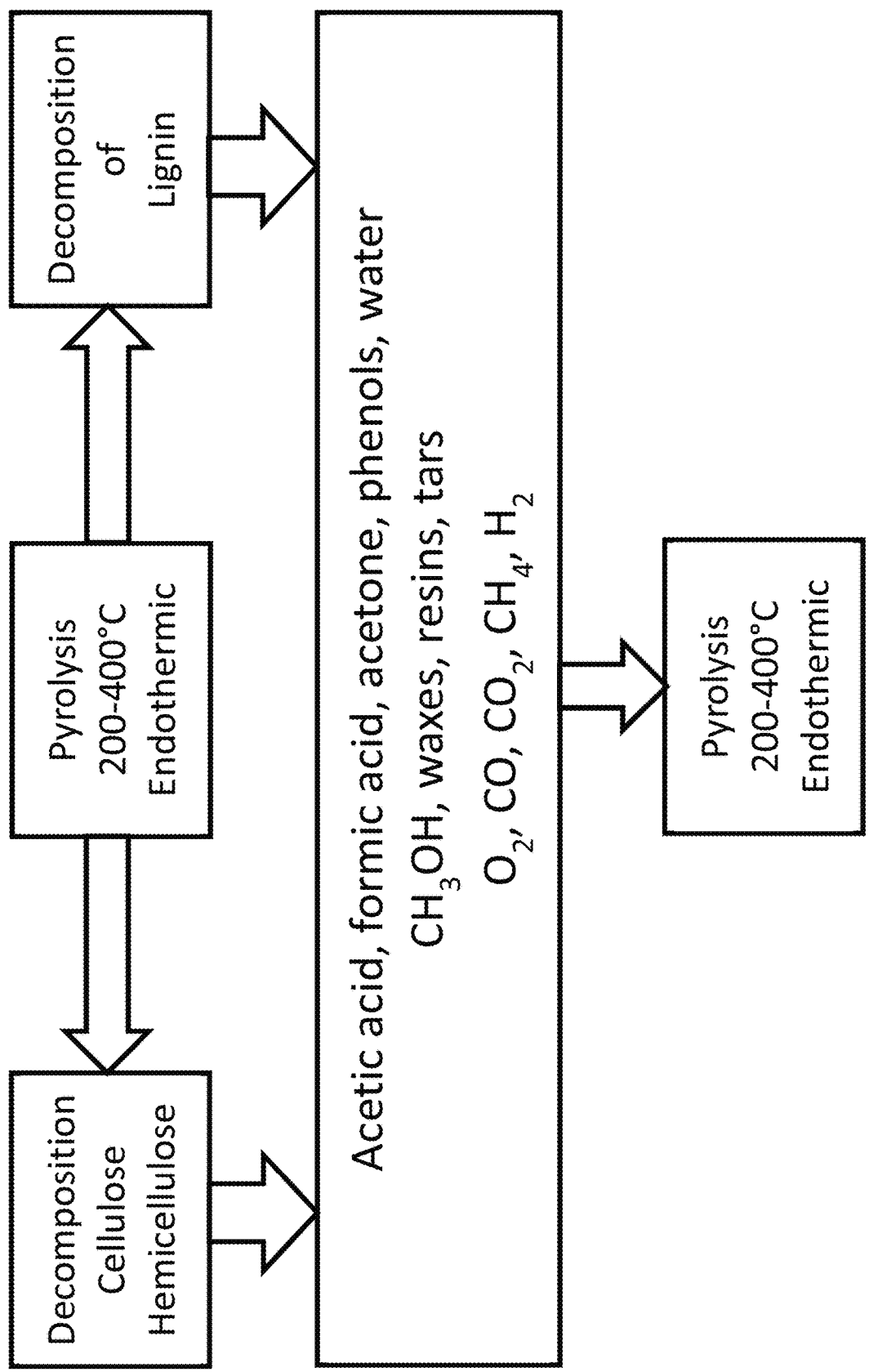
FIG. 1 is a chart depicting selected processes occurring during gasification of carbon-containing materials, and their products.
Figure 2:
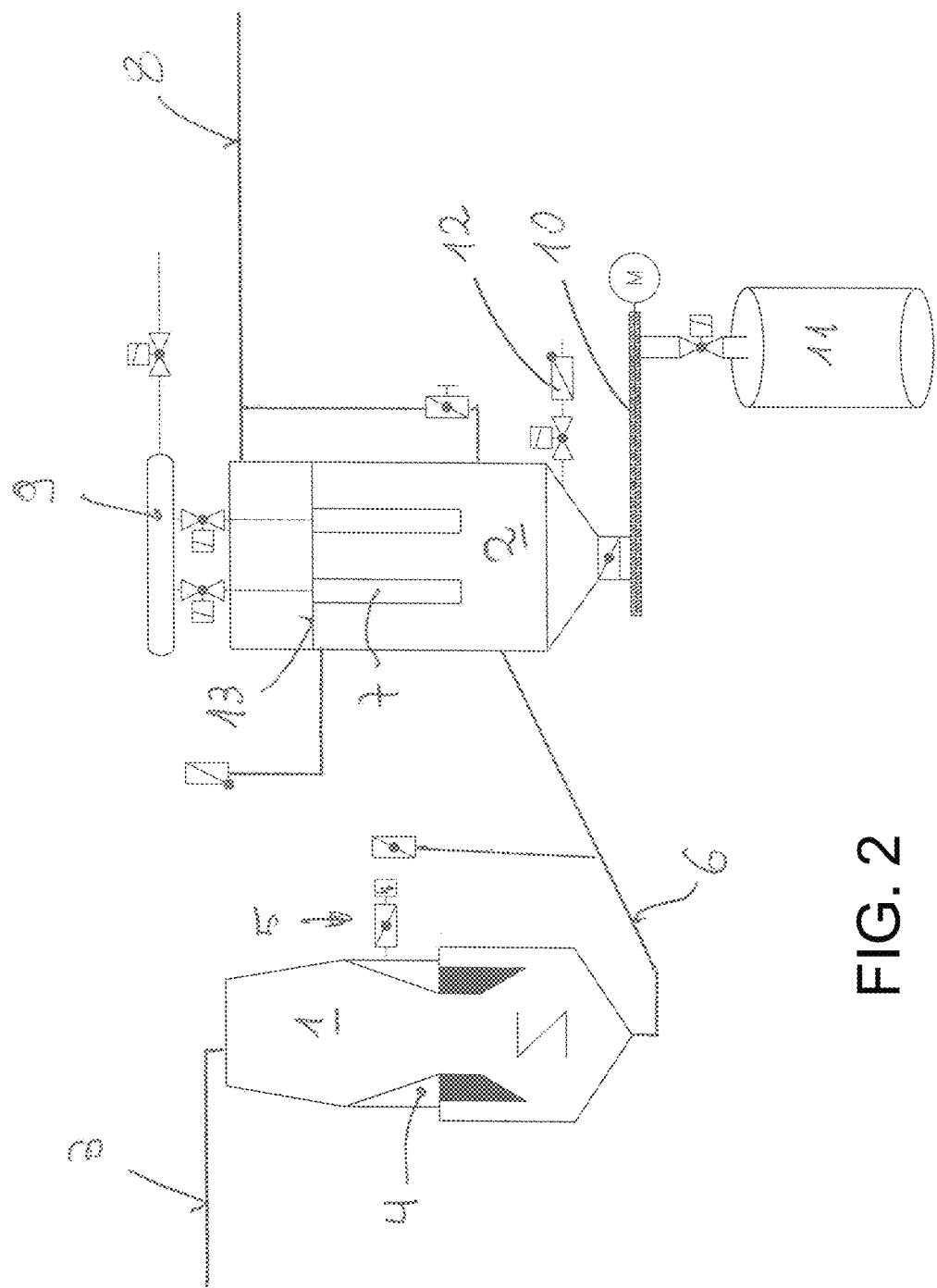
FIG. 2 is a schematic depiction of a gasification plant according to an exemplary embodiment of the current invention.

A plant according to the invention is depicted purely schematically in FIG. 2. The depiction of all of the components which are not causally associated with the invention has been left out. In particular, the numerous meters, the regulating and shutoff elements, the control, the components upstream and downstream of the plant, such as stores, drying apparatus, final product gas cleaning, and transfer to the user, are very well known to the person skilled in the field of wood gasification plants, and require no more detailed elucidation in connection with the invention.

The plant of the invention, with its components and elements necessary for the invention—albeit without the meters, etc.—is depicted schematically, and features essentially the following: a gas generator 1 and a hot gas filter 2. Wood chips, wood pellets, coal or the like, from a reservoir bunker which is not shown, are supplied via a feed 3 to the gas generator 1, appropriately at its top, and, in the generator, they pass through the steps, known from the prior art and referred to at the outset, of drying, of carbonization, of oxidation, and of reduction; in the bottom region, indicated by the installation 4, air is appropriately supplied by a line and a distributor system 5. This apparatus is a conventional wood gasifier having a fixed bed operated in concurrent. In the bottom region, after the oxidation, there is reduction, and uncombusted portions and ash are drawn off with the product gas via a line 6 in the bottom region of the gas generator, and are introduced into the middle region of a hot gas filter 2.

Projecting into this bottom region of the hot gas filter 2 are filter candles 7 comprising a filter bottom 13, directed downward. Although one filter candle is sufficient under certain circumstances, it is favorable, for continuous operation, though not vital, for at least two such filter candles 7 to be provided. The product gas passes through the filter candles and arrives, here as product referred to as clean gas, into the upper region of the hot gas filter 2, from where it is taken off via a clean gas line 8 and supplied for further processing and/or use.

The filter candles 7 are connected controllably to a pressurized air supply 9; by means of this compressed air supply, they can be placed in a pulselike manner, on their clean gas side, under superatmospheric pressure, in order to burst filter cakes which have collected on the crude gas side and to permit at least partial gasification. Provided in the bottom region of the hot gas filter 2 is an outlet 10 for the ungasified constituents, and a corresponding ash vat 11.

Then, in accordance with the invention, as already mentioned, via line 12, oxygen, in the form for example of air, optionally heated and/or dried, is supplied into the region below the filter bottom 13 (approximately at the lower end of the filter candles), and consequently, in the crude gas region of the hot gas filter 2, there is a further, very largely complete gasification of those constituents of the wood that up to this point have not been gasified.

In this way, the remaining, ungasified fraction of the wood can be reduced substantially to the mineral ash, with notable consequences both for the environment and in economic respects: in the prior art, 5 to 10 wt % of the fuel used is ungasifiable, and therefore requires proper disposal; as a result of the invention, this fraction is compressed to less than 1 wt % of the fuel used, and so the invention produces a boost in yield from 90%-95% to 99%, with the plus of a reduction in waste to 10-20% of the previous level of waste. On the other side are the negligible extra costs of strengthening the draft in line 6, and the costs for the blowing of the reaction air through line 12 into the hot gas filter 2, which are insubstantial.

The invention is not confined to the exemplary embodiment shown, but can be modified in a variety of ways. For instance, with large plants, a plurality of gas generators and/or of hot gas filters can be fittingly combined with one another, in order to obtain continuous operation even in the event of maintenance. For wood constituents which are too heavy even for the increased draft, a discharge device for such parts can be provided in the gas generator; whether these parts are subsequently resupplied to the gas generator or else disposed of depends on the nature of the starting material and the possibility for return into the product stream.

The invention can be combined with various other embodiments of the method or of the apparatus, as long as the only reaction in the hot gas filter is not disrupted and/or the other embodiments of the filter operation do not cause disruption.

As a result of the implementation of the second gasification step in the hot gas filter, the status conditions there are not changed in so substantial a manner as to necessitate a change in or adaptation of the materials, and it is therefore possible to use all the components and materials which are also contemplated for this purpose by the skilled person with conventional hot gas filters.

The level of the entry of nozzles or other openings of the supply line 12 into the hot gas filter 2 is appropriately, when filter candles 7 are present, at the bottom end thereof. There, when the filter cake is burst apart, the entire material will pass in front, just as, during undisrupted operation, the material not yet gasified likewise passes in front. Operating parameters such as superatmospheric pressure and volume flow rate are easily determined by means of a few trials. If different materials are being degassed, it is advantageous under certain circumstances to provide nozzles at different heights, which may be provided individually or in groups.

It is also possible, through slanted arrangement of nozzles, to obtain specific flow patterns through which the further gasification is promoted.

In summary it may be stated that the invention provides an apparatus for gasifying carbon-containing material, more particularly wood, having a gas generator 1, to which the material for gasification is supplied in its upper region and to which oxygen, usually in the form of air, is supplied in its middle region, and in whose lower region it is largely gasified in a fixed bed reactor, the product gas being drawn off via a product gas line 6 from the lowermost region of the gas generator 1 and introduced into the lower region of a hot gas filter 2, where a filter, preferably provided with filter candles 7, removes solids such as particles not yet gasified, ash, and foreign bodies, while the clean gas passes through and is taken off via a clean gas line 8, an outlet 10 being provided for taking off the residual solids in the bottom region of the hot gas filter 2. Here, the hot gas filter 2 is supplied in its middle height region, between the filter bottom 13 and the outlet 10, through a line 12, with oxygen, preferably in the form of air.

The invention also relates to a method for gasifying carbon-containing material, more particularly wood, featuring a gas generator 1 and a hot gas filter 2 downstream thereof in the product stream, wherein the hot gas filter 2 is supplied, ahead of the filter in the product stream, with oxygen, preferably in the form of air, and so a further gasification procedure takes place.

It should also be noted that details such as "largely" in the case of materials mean more than 50 wt %, preferably more than 80 wt %, and more preferably more than 95 wt %; that "bottom region" of a reactor, filter, construction, or apparatus or, very generally, of an article, means the lower half and more particularly the lower quarter of the overall height, "lowermost region" means the lowermost quarter and more particularly an even smaller part; while "middle region" refers to the middle third of the overall height. All of these details, along with "top", "bottom", etc., have their generally accepted meaning, applied to the as-defined position of the article under consideration.

"Substantially" can be delimited with a deviation of 10% from the stated figure, if physically possible, both upwardly and downwardly, or otherwise only in the direction that makes sense.

| List of reference symbols: | |
|---|---|
| 01 | Gasifier |
| 02 | Hot air filter |
| 03 | Supply |
| 04 | Installation |
| 05 | Distributor system |
| 06 | Product line |
| 07 | Filter candle(s) |
| 08 | Clean gas line |
| 09 | Compressed air supply |
| 10 | Outlet |
| 11 | Ash bin |
| 12 | Supply line |
| 13 | Filter bottom |

What is claimed:

1. An apparatus for gasifying carbon-containing material, comprising:
 a gas generator; the gas generator having an upper region, a middle region, and a lower region; wherein the carbon-containing material is supplied to the upper region of the gas generator, oxygen is supplied to the middle region of the gas generator, and the carbon-containing material is largely gasified to a product gas in a fixed bed reactor in the lower region of the gas generator;
 a hot gas filter, wherein the hot gas filter receives the product gas from the gas generator via a product gas line coupled to a lowermost region of the gas generator and passes the product gas through a filter assembly to yield a clean gas; the hot gas filter further including a solids outlet in a bottom region of the hot gas filter for taking off residual solids removed from the product gas by the filter assembly; and
 a gas line configured to supply oxygen to a middle region of the hot gas filter between the filter assembly and the solids outlet, resulting in an additional gasification of residual constituents of the carbon-containing material present in the product gas received by the hot gas filter from the gas generator.

2. The apparatus of claim 1, wherein oxygen is supplied to the middle region of the gas generator in the form of air.

3. The apparatus of claim 1, wherein the carbon-containing material includes wood.

4. The apparatus of claim 1, wherein the filter assembly includes one or more filter candles.

5. The apparatus of claim 1, wherein the filter assembly is configured to remove solid particles not yet gasified, ash, and foreign bodies.

6. The apparatus of claim 1, wherein oxygen is supplied to the middle region of the hot gas filter in the form of air.

7. The apparatus of claim 1, wherein a draft in the product gas line is sufficiently strong that particles not gasified in the gas generator are transported substantially into the hot gas filter.

\* \* \* \* \*